UNITED STATES PATENT OFFICE.

OTTO MARCUS, OF PORTLAND, OREGON, ASSIGNOR, BY DIRECT AND MESNE ASSIGNMENTS, OF TWO-FIFTHS TO BENJAMIN SAGORSKY AND ONE-FIFTH TO WILLIAM MARGULIS, BOTH OF PORTLAND, OREGON.

KINDLING-BLOCK.

1,183,752.     Specification of Letters Patent.     Patented May 16, 1916.

No Drawing.     Application filed June 3, 1915. Serial No. 31,982.

*To all whom it may concern:*

Be it known that I, OTTO MARCUS, a citizen of the United States, residing in the city of Portland, county of Multnomah, and State of Oregon, have invented certain new and useful Improvements in Kindling-Blocks, of which the following is a specification.

My invention relates to kindling blocks, and more particularly to a kindling block manufactured from wood shavings, sawdust, ground corncobs, or other combustible matter to give body or bulk thereto, as hereinafter set forth.

Among the salient objects of my invention are,—to provide an improved and economical kindling block which can be readily ignited directly from a match and which will burn with sufficient intensity to ignite even the hardest coal, thereby doing away with the necessity of using kindling wood, or other fire-starting material; to provide a kindling block with an igniting substance, which will ignite under friction, thus producing a self-igniting kindling block, which can be ignited by simply rubbing or scratching the same upon a suitable surface similar to striking a match; to provide in combination with a kindling block of the character referred to, igniting substance which can be ignited only by being struck upon a specially prepared surface, thus providing a safety self-igniting kindling block, which can be shipped with perfect safety.

Other objects and advantages of my invention will be apparent from the following description of one practical embodiment thereof, which I will now describe.

In carrying out my invention, I employ dry wood shavings, sawdust, preferably coarse, or dry coarsely ground corncobs may be used. This is first steeped in turpentine, using approximately 30 parts of the shavings, or sawdust, to 7 parts of turpentine. I next mix together 5 parts potassium nitrate and 5 parts of charcoal (carbo ligni) and stir the same into 53 parts of liquid rosin, which has first been heated to the boiling point, after which the wood shavings, or sawdust, is stirred into the hot mixture until it forms a thick batter-like substance. This is then poured into suitable forms, preferably forming the same into sheets or blocks grooved so that pieces can be easily broken off from the sheet or body. The matter thus prepared cools very quickly and it must be removed from the forms soon after it commences to cool.

I will next describe an igniting substance which can be applied to one edge or surface of the blocks, whereby they can be ignited by rubbing or striking them against a suitable surface. The following formula may be used for this purpose:

Yellow phosphorus__ 0.5 parts by weight.
Potassium chlorate__ 4. " " "
Gum glue _____ 2. " " "
Powdered glass _____ 4. " " "

A coloring substance may be used such as ultramarine blue, if desired.

This igniting surface is prepared by dissolving the yellow phosphorus in chloroform and heating the same; dissolving the potassium chlorate and gum glue in warm water; then slowly stirring the dissolved yellow phosphorus into the dissolved potassium chlorate and gum glue, and then adding the powdered glass, and coloring matter to give the desired shade thereto. This preparation is then applied to a surface of the kindling block by means of a brush, whereupon the kindling block is made self-igniting by simply striking it upon a suitable surface.

I will next describe an igniting substance which can be ignited only by striking the same upon a specially prepared surface.

The preparation applied to the kindling block may be made as follows: 1 part of antimony sulfid, 1 part of potassium chlorate, 2 parts of glue, 10 parts powdered glass.

The substance to be applied to the surface on which the block coated with the foregoing preparation may be prepared as follows: 2 parts red phosphorus, 1 part glue, 1 part powdered glass. This is dissolved together, mixed to the consistency of a batter and applied to the surface on which the block may be struck, for the purpose of igniting the same.

I am aware that many different kinds of igniting compounds can be used, and I do not, therefore, limit my invention to any particular igniting composition.

So far as I am aware, I am the first to provide a manufactured kindling block with an igniting composition, whereby it can be ignited by simply rubbing it upon a suitable surface and dropping it into the fire-box of the stove, and placing the fuel used thereupon. It will be readily seen that this block has many uses and will be particularly welcome for building camp fires and the like.

What I claim and desire to protect by Letters Patent is,—

1. An article of manufacture comprising in combination, in block form, combustible matter steeped in turpentine, potassium nitrate, charcoal and rosin, substantially as described.

2. An article of manufacture comprising in combination, in block form, 30 parts of combustible matter, 7 parts of turpentine, 5 parts of potassium nitrate, 5 parts of charcoal, and 53 parts of rosin, substantially as described.

3. An article of manufacture comprising in combination, in block form, comminuted combustible matter steeped in turpentine, potassium nitrate, charcoal, and a binding ingredient for holding the same together in a solid mass, substantially as described.

4. An article of manufacture, comprising in combination, a comminuted combustible matter steeped in turpentine, potassium nitrate, charcoal, rosin, and a coating of igniting matter forming a part thereof, substantially as described.

Signed at Portland, Multnomah county, Oregon, this 29th day of May, 1915.

OTTO MARCUS.

In witness of—
BENJAMIN SAGORSKY,
I. M. GRIFFIN.

Copies of this patent may be obtained for five cents each, by addressing the "Commissioner of Patents, Washington, D. C."